United States Patent
Kyritsis et al.

(10) Patent No.: US 11,655,427 B2
(45) Date of Patent: May 23, 2023

(54) AMMONIA COMBUSTION AND METHODS RELATING THERETO

(71) Applicant: Khalifa University of Science and Technology, Abu Dhabi (AE)

(72) Inventors: Dimitrios Kyritsis, Abu Dhabi (AE); Dimitrios Goussis, Abu Dhabi (AE)

(73) Assignee: KHALIFA UNIVERSITY OF SCIENCE AND TECHNOLOGY, Abu Dhabi (AE)

( * ) Notice: Subject to any disclaimer, the term of this patent is extended or adjusted under 35 U.S.C. 154(b) by 0 days.

(21) Appl. No.: 17/521,924

(22) Filed: Nov. 9, 2021

(65) Prior Publication Data

US 2022/0154088 A1    May 19, 2022

Related U.S. Application Data

(60) Provisional application No. 63/114,715, filed on Nov. 17, 2020.

(51) Int. Cl.
| | |
|---|---|
| *C10L 1/12* | (2006.01) |
| *C10L 9/12* | (2006.01) |
| *F02B 47/02* | (2006.01) |
| *F02M 25/03* | (2006.01) |

(52) U.S. Cl.
CPC ............ *C10L 1/1266* (2013.01); *C10L 1/125* (2013.01); *C10L 1/1258* (2013.01); *C10L 9/12* (2013.01); *F02B 47/02* (2013.01); *F02M 25/03* (2013.01); *C10L 2200/0254* (2013.01); *C10L 2200/0259* (2013.01); *C10L 2200/0295* (2013.01); *C10L 2270/023* (2013.01); *C10L 2270/026* (2013.01)

(58) Field of Classification Search
CPC ...... C10L 1/1266; C10L 1/125; C10L 1/1258; C10L 9/12; C10L 2200/0254; C10L 2200/0259; C10L 2200/0295; C10L 2270/023; C10L 2270/026; F02B 47/02; F02M 25/03; Y02T 10/12
See application file for complete search history.

(56) References Cited

U.S. PATENT DOCUMENTS

| | | | | | |
|---|---|---|---|---|---|
| 4,030,455 | A | * | 6/1977 | Van Eeck | F02M 25/00 123/3 |
| 4,409,931 | A | * | 10/1983 | Lindberg | F02M 25/00 123/25 J |
| 5,443,805 | A | * | 8/1995 | Beer | B01D 53/60 423/243.08 |
| 6,435,153 | B1 | * | 8/2002 | McAliece | F02B 69/06 123/193.5 |

(Continued)

OTHER PUBLICATIONS

Altarawneh, M.K., et al., "Rate constants for reactions of ethylbenzene with hydroperoxyl radical", Combust. Flame 2013, 160, 9-16.

(Continued)

*Primary Examiner* — Pamela H Weiss

(74) *Attorney, Agent, or Firm* — Billion & Armitage

(57) ABSTRACT

Described are methods for shortening the combustion delay of ammonia fuels and reducing the amount of NO formed during the combustion process. The methods include mixing ammonia with hydrogen peroxide and water to form a fuel mixture and then combusting the fuel mixture. Methods of powering an internal combustion engine with ammonia fuels are also described.

13 Claims, 8 Drawing Sheets

(56) References Cited

U.S. PATENT DOCUMENTS

| | | | | |
|---|---|---|---|---|
| 2011/0108000 | A1* | 5/2011 | Williams | F02M 25/03 |
| | | | | 123/25 C |
| 2012/0180741 | A1* | 7/2012 | Strey | C10L 1/328 |
| | | | | 123/1 A |
| 2012/0280517 | A1* | 11/2012 | Hair, III | F02M 25/12 |
| | | | | 123/3 |

OTHER PUBLICATIONS

Cai, T., et al., "NOx emission and thermal performances studies on premixed ammonia-oxygen combustion in a CO2-free micro-planar combustor", Fuel 2020, 280, 118554.

Cox, L., "Nitrogen Oxides (NOx) Why and How They Are Controlled", Diane Publishing: Collingdon, PA, USA, 1999.

Diamantis, D.J., et al., "H2/air autoignition: The nature and interaction of the developing explosive modes", Combust. Theory Model. 2015, 19, 382-433.

Donohoe, N., et al., "Influence of steam dilution on the ignition of hydrogen, syngas and natural gas blends at elevated pressures", Combust. Flame 2015, 162, 1126-1135.

Duynslaegher, C., et al., "Ammonia combustion at elevated pressure and temperature conditions", Fuel 2010, 89, 3540-3545.

Frigo, S., et al., "Analysis of the behaviour of a 4-stroke Si engine fuelled with ammonia and hydrogen", Int. J. Hydrogen Energy 2013, 38, 1607-1615.

Gill, S., et al., "Assessing the effects of partially decarbonising a diesel engine by co-fuelling with dissociated ammonia", Int. J. Hydrogen Energy 2012, 37, 6074 6083.

Glarborg, P., et al., "Modeling nitrogen chemistry in combustion", Prog. Energy Combust. Sci. 2018, 67, 31-68.

Glassman, I., et al., "Combustion", Academic Press: Cambridge, MA, USA, 2014.

Goussis, D.A., et al., "A study of homogeneous methanol oxidation kinetics using CSP", Symp. Combust. 1992, 24, 113-120.

Goussis, D.A., et al., "Reactive and reactive-diffusive time scales in stiff reaction-diffusion systems", Prog. Comput. Fluid Dyn. Int. J. 2005, 5, 316-326.

Goussis, D.A., "The role of slow system dynamics in predicting the degeneracy of slow invariant manifolds: the case of vdP relaxation-oscillations", Phys. D Nonlinear Phenom. 2013, 248, 16-32.

Gross, C.W., et al., "Performance characteristics of a compression-ignition engine using direct-injection ammonia—DME mixtures", Fuel 2013, 103, 1069-1079.

Hadjinicolaou, M., et al., "Asymptotic solution of stiff PDEs with the CSP method: the reaction diffusion equation", SIAM J. Sci. Comput. 1998, 20, 781-810.

Hayakawa, A., et al., "NO formation/reduction mechanisms of ammonia/air premixed flames at various equivalence ratios and pressures", Mech. Eng. J. 2015, 14-00402.

He, X., et al., "Auto-ignition kinetics of ammonia and ammonia/hydrogen mixtures at intermediate temperatures and high pressures", Combust. Flame 2019, 206, 189-200.

Khalil, A.T., et al., "Algorithmic Analysis of Chemical Dynamics of the Autoignition of NH3—H2O2/Air Mixtures", Energies 2019, 12, 4422.

Koch, E., "Ammonia—A fuel for motor buses", J. Inst. Pet 1945, 31, 213.

Kooshkbaghi, M., "I.V. n-Heptane/air combustion in perfectly stirred reactors: Dynamics, bifurcations and dominant reactions at critical conditions", Combust. Flame 2015, 162, 3166-3179.

Kroch, E., "Ammonia, A Fuel for Motor Buses", J. Inst. Pet 1945, 31, 213-223.

Lam, S.H., et al., "The CSP method for simplifying kinetics", Int. J. Chem. Kinet. 1994, 26, 461-486.

Lam, S.H., et al., "Understanding complex chemical kinetics with computational singular perturbation", Proc. Combust. Inst. 1989, 22, 931-941.

Law, C.K., "Combustion Physics", Cambridge University Press: New York, NY, USA, 2006.

Le Cong, T., et al., "Experimental and detailed modeling study of the effect of water vapor on the kinetics of combustion of hydrogen and natural gas, impact on NOx", Energy Fuels 2009, 23, 725-734.

Lee, D., et al., "Development of combustion strategy for the internal combustion engine fueled by ammonia and its operating characteristics", J. Mech. Sci. Technol. 2018, 32, 1905-1925.

Li, J., et al., "Numerical study on effect of oxygen content in combustion air on ammonia combustion", Energy 2015, 93, 2053-2068.

Li, J., et al., "Numerical study on laminar burning velocity and ignition delay time of ammonia flame with hydrogen addition", Energy 2017, 126, 796-809.

Li, J., et al., "Study on using hydrogen and ammonia as fuels: Combustion characteristics and NOx formation", Int. J. Energy Res. 2014, 38, 1214-1223.

Li, Y., et al., "The oxidation of 2-butene: A high pressure ignition delay, kinetic modeling study and reactivity comparison with isobutene and 1-butene", Proc. Combust. Inst. 2017, 36, 403-411.

Lu, T., et al., "Three-dimensional direct numerical simulation of a turbulent lifted hydrogen jet flame in heated coflow: A chemical explosive mode analysis", J. Fluid Mech. 2010, 652, 45.

Luo, Z., et al., "Chemical explosive mode analysis for a turbulent lifted ethylene jet flame in highly-heated coflow", Combust. Flame 2012, 159, 265-274.

Manias, D.M., et al., "The mechanism by which CH2O and H2O2 additives affect the autoignition of CH4/air mixtures", Combust. Flame 2016, 164, 111-125.

Maris, D.T., et al., "The "hidden" dynamics of the Rössler attractor", Phys. D Nonlinear Phenom. 2015, 295, 66-90.

Miller, J.A., et al., "Kinetic modeling of the oxidation of ammonia in flames. Combust", Sci. Technol. 1983, 34, 149-176.

Miller, J.A., et al., "Mechanism and modeling of nitrogen chemistry in combustion. Prog. Energy Combust", Sci. 1989, 15, 287-338.

Najm, H.N., et al., "Analysis of NO structure in a methane-air edge flame", Proc. Combust. Inst. 2009, 32, 1117-1124.

Philibert, C., "Producing Ammonia and Fertilizers: New Opportunities From Renewables", International Energy Agency: Paris, France, 2017.

Rawadieh, S.E., et al., "Reaction of Hydroperoxy Radicals with Primary C1-5 Alcohols: A Profound Effect on Ignition Delay Times", Energy Fuels 2019, 33, 11781-11794.

Reiter, A.J., et al., "Combustion and emissions characteristics of compression-ignition engine using dual ammonia—diesel fuel", Fuel 2011, 90, 87-97.

Reiter, A.J., et al., "Demonstration of compression-ignition engine combustion using ammonia in reducing greenhouse gas emissions", Energy Fuels 2008, 22, 2963-2971.

Ryu, K., et al., "Effects of gaseous ammonia direct injection on performance characteristics of a spark-ignition engine", Appl. Energy 2014, 116, 206-215.

Saika, T., et al., "Study of hydrogen supply system with ammonia fuel", JSME Int. J. Ser. B Fluids Therm. Eng. 2006, 49, 78-83.

Shan, R., et al., "Computational diagnostics for n-heptane flames with chemical explosive mode analysis", Combust. Flame 2012, 159, 3119-3127.

Somarathne, K.D.K.A, et al., "Emission characteristics of turbulent non-premixed ammonia/air and methane/air swirl flames through a rich-lean combustor under various wall thermal boundary conditions at high pressure", Combust. Flame 2019, 210, 247-261.

Sorrentino, G., et al., "Low-NOx conversion of pure ammonia in a cyclonic burner under locally diluted and preheated conditions", Appl. Energy 2019, 254, 113676.

Tian, Z., et al., "An experimental and kinetic modeling study of premixed NH3/CH4/O2/Ar flames at low pressure", Combust. Flame 2009, 156, 1413-1426.

Tingas, E.A., et al., "Algorithmic determination of the mechanism through which H2O-dilution affects autoignition dynamics and NO formation in CH4/air mixtures", Fuel 2016, 183, 90-98.

Tingas, E.A., et al., "Autoignition dynamics of DME/air and EtOH/air homogeneous mixtures", Combust. Flame 2015, 162, 3263-3276.

(56) References Cited

OTHER PUBLICATIONS

Valorani, M., et al., "CSP analysis of a transient flame-vortex interaction: time scales and manifolds", Combust. Flame 2003, 134, 35-53.

Westbrook, C.K., et al., "Chemical kinetic modeling of hydrocarbon combustion", Prog. Energy Combust. Sci. 1984, 10, 1-57.

Westlye, F.R., et al., "Experimental investigation of nitrogen based emissions from an ammonia fueled SI-engine", Fuel 2013, 111, 239-247.

Williams, F.A., "Combustion Theory", The Benjamin/Cummings Publ. Co.: Menlo Park, CA, USA, 1985.

Zamfirescu, C., et al., "Ammonia as a green fuel and hydrogen source for vehicular applications", Fuel Process. Technol. 2009, 90, 729-737.

* cited by examiner

AMMONIA COMBUSTION AND METHODS RELATING THERETO

RELATED APPLICATIONS

This application claims the benefit of U.S. Provisional Application No. 63/114,715, which was filed on 17 Nov. 2020 in the United States and which application is incorporated herein by reference. A claim of priority to this application, to the extent appropriate, is hereby made.

BACKGROUND

Although the potential advantages of hydrogen as an energy carrier are widely acknowledged, especially in the context of climate change and the need for zero-$CO_2$-footprint energy conversion, serious problems with hydrogen management (e.g., storage and distribution infrastructure) have delayed the onset of the so-called "hydrogen economy" Ammonia could serve as a carbonless "hydrogen carrier" as it is a fuel that contains hydrogen and can burn without $CO_2$ emissions.

Ammonia is a substance that can be liquified at easily manageable pressures and temperatures Ammonia storage and distribution technology is widespread and mature because of its use as a fertilizer. Notably, liquid ammonia can provide higher hydrogen density than hydrogen liquid itself.

Small fleets of ammonia-fueled buses appeared during WWII in Belgium and Italy due to intense shortage of hydrocarbons in central Europe at that time. However, the operation of those ammonia-fueled vehicles would be unacceptable by any contemporary standard of efficiency and emissions. Attempts to adopt ammonia as a fuel in the past have usually centered on mixing ammonia with either diesel or hydrogen. However, co-firing ammonia with hydrocarbons frustrates the goal of carbon-neutrality and co-firing with hydrogen would still incur the problems surrounding storing and distributing hydrogen.

There is a need for improved methods of using ammonia as a fuel.

SUMMARY

In some embodiments, the present invention includes methods for combusting ammonia. The methods for combusting ammonia include directing ammonia, hydrogen peroxide, and water into a chamber to create a fuel mixture. The fuel mixture is combusted with an oxidant.

In some embodiments, the present invention includes methods for powering an internal combustion engine. The methods for powering an internal combustion engine include directing ammonia, hydrogen peroxide, and water into a combustion chamber of the internal combustion engine to create a compressed fuel mixture. The combustion chamber is defined by a cylinder and a piston. The compressed fuel mixture is combusted to increase a pressure in the combustion chamber and generate a force acting against the piston.

This summary is intended to provide an overview of subject matter of the present disclosure. It is not intended to provide an exclusive or exhaustive explanation of the invention. The detailed description is included to provide further information about the present patent application.

BRIEF DESCRIPTION OF THE DRAWINGS

In the drawings, which are not necessarily, drawn to scale, like numerals may describe similar components in different views. The drawings illustrate generally, by way of example, but not by way of limitation, various embodiments discussed herein.

DETAILED DESCRIPTION

In view of the strong societal interest in carbon neutrality, ammonia has been proposed as a hydrogen source that can be easily liquified, cost-effectively produced and stored at low pressures, and deployed through a reliable and extensive distribution network. However, use of ammonia as a fuel has been hampered by two problems: i) ammonia has a relatively long ignition delay as compared to some hydrocarbon-based fuels and ii) combusting ammonia tends to create relatively high amounts of $NO_x$ emissions. The present invention provides surprising and non-intuitive solutions to both problems by combusting ammonia in the presence of hydrogen peroxide and water.

Figure 7:
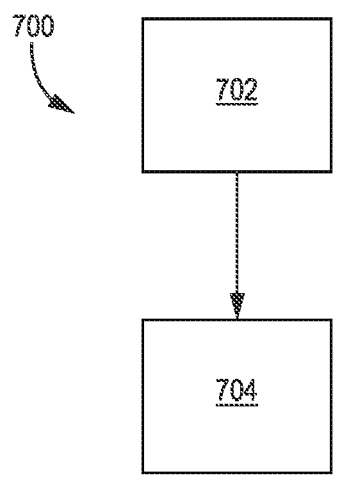

In some embodiments the present invention includes methods for combusting ammonia. FIG. 7 illustrates a flow-chart illustrating an embodiment of the invention in the form of method 700.

In step 702 of method 700, a fuel mixture is formed. The fuel mixture comprises, consists essentially of, or consists of liquid or gaseous ammonia, liquid or gaseous hydrogen peroxide, and liquid or gaseous water.

In some embodiments, the fuel mixture is formed by directing the ammonia, hydrogen peroxide, and water into a combustion chamber (e.g., the combustion chamber of an internal combustion engine, such as one defined by a piston and a cylinder). In some embodiments, the ammonia, hydrogen peroxide, and water can be directed into the combustion chamber individually, sequentially, simultaneously, or in some pre-mixed combination. For example, the ammonia, hydrogen peroxide, and water may all be directed simultaneously into the combustion chamber through the same intake valve or through their own dedicated intake vales. In a further example, the ammonia is premixed with the hydrogen peroxide, the ammonia/hydrogen peroxide mixture is then directed into the combustion chamber (through an intake valve), and water is directed into the combustion chamber (through the same or different intake valve).

The amount of hydrogen peroxide in the fuel mixture is 5% molar or less. That is, hydrogen peroxide makes up 5 moles or less of every 100 moles of fuel mixture. For example, in some embodiments the amount of hydrogen peroxide in the fuel mixture is about 0.25% molar, about 0.5% molar, about 1% molar, about 1.5% molar, about 2% molar, about 2.5% molar, about 3% molar, about 3.5% molar, about 4% molar, about 4.5% molar, about 5% molar, or any incremental value or subrange between these amounts. For example, the amount of hydrogen peroxide in the fuel mixture can be between about 0.5% molar and about 5% molar, between about 0.5% molar and about 4.5% molar, between about 1% molar and about 5% molar, between about 1% molar and about 4% molar, between about 1% molar and about 3% molar, between about 1% molar and about 2.5% molar, between about 1.5% molar and about 5% molar, between about 1.5% molar and about 4% molar, between about 1.5% molar and about 3% molar, or between about 1.5% molar and about 2.5% molar.

The amount of water in the fuel mixture is 50% molar or less. That is, water makes up 50 moles or less of every 100 moles of fuel mixture. For example, in some embodiments the amount of hydrogen peroxide in the fuel mixture is about 5% molar, about 10% molar, about 15% molar, about 20% molar, about 25% molar, about 30% molar, about 35% molar, about 40% molar, about 45% molar, about 50% molar, or any incremental value or subrange between these amounts. For example, the amount of hydrogen peroxide in the fuel mixture can be between about 5% molar and about 50% molar, between about 5% molar and about 40% molar, between about 5% molar and about 30% molar, between about 5% molar and about 25% molar, between about 5% molar and about 20% molar, or between about 5% molar and about 15% molar.

In step 704 of method 700, the fuel mixture is combusted with one or more oxidants. Examples of suitable oxidants includes air or oxygen.

Figure 8:
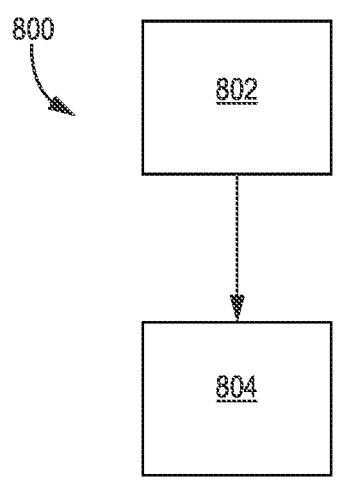
FIG. 8 illustrates a flow-chart for a method of powering an internal combustion engine.

In some embodiments of the invention, the inventive combustion methods are used to power an internal combustion engine (e.g., a spark-ignition engine or a compression-ignition engine). FIG. 8 illustrates a flow-chart illustrating an embodiment of the invention in the form of method 800.

In step 802 of method 800, a fuel mixture is formed within a combustion chamber of an internal combustion engine. The combustion chamber is defined by a cylinder and a piston, and ammonia, hydrogen peroxide, and water are directed into the combustion chamber to create a fuel. The fuel within the combustion chamber can have the same compositions as the other inventive fuels described herein. The piston compresses the fuel mixture in the cylinder to form a compressed fuel. In some embodiments, the piston generates a compression ratio of between 12 and 20 in the cylinder. In some embodiments, an oxidant (e.g., air or pure oxygen) is directed into the cylinder before, during, or after the cylinder has compressed the fuel mixture.

In step 804 of method 800, the compressed fuel mixture is combusted with the oxidant to increase a pressure in the combustion chamber and generate a force acting against the piston.

EXAMPLES

Example 1—$H_2O_2$ Decreases Ignition Delay

Figure 1:
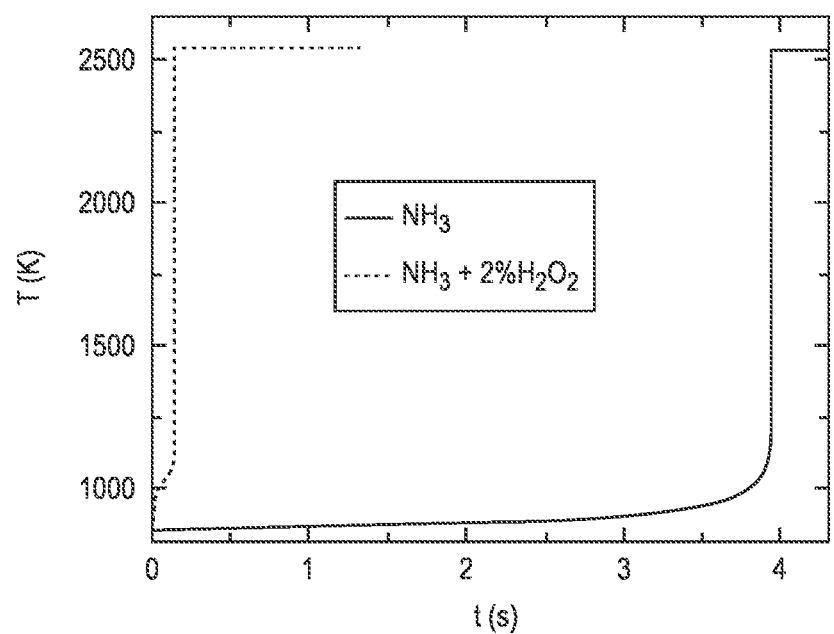
FIG. 1 illustrates a graph showing the temperature evolution during autoignition of pure $NH_3$/air and $NH_3$/air mixed with 2%-molar $H_2O_2$

An examination of the chemical dynamics of the autoignition of ammonia showed that the addition of hydrogen peroxide could drastically decrease the ignition delay of ammonia. FIG. 1 illustrates a graph showing the temperature evolution during autoignition of pure $NH_3$/air and $NH_3$/air mixed with 2%-molar $H_2O_2$. As can be seen, the addition of 2%-molar $H_2O_2$ reduced the ignition delay by a factor of about 30.

However, it was also found that adding that amount of hydrogen peroxide increased the amount of NO emissions by about 2%. It is believed the increase in NO emissions was the result of both thermal and chemical action, due to an early temperature rise because of a two-stage autoignition and the enhanced action of the reaction $H_2O_2$ (+M)→OH+ OH (+M). NO emissions increased with the amount of $H_2O_2$ in the mixture. $H_2O_2$ had the same effect on $NO_2$ and $N_2O$, although the final mass fraction of these species was much small than that of NO.

The drastic reduction of ignition delay with $H_2O_2$ is an important finding because it shows that $H_2O_2$ addition offered a means to overcome a significant problem with $NH_3$ combustion, namely long ignition delays. However, the issue of NO emissions remained and was even slightly exacerbated.

Example 2—CSP Methodology

To address the issue of increased NO emissions caused by the addition of hydrogen peroxide, we studied the dynamics of NO formation during the autoignition of $NH_3$-air mixtures using the method of Computational Singular Perturbation (CSP). We focused on the slow chemical dynamics relating to NO formation by identifying the reactions that significantly contributed to the time scale characterizing NO emissions as well as on the identification of an additive that would reduce these emissions while improving ignition delay.

The autoignition of an isochoric adiabatic homogeneous mixture of ammonia/air was examined using CSP, which provides algorithmic tools for the analysis of multi-scale systems. A chemical kinetics mechanism of N=34 species, E=5 elements (O, H, N, He and Ar), and K=211 reversible elementary reactions was used in the study. With the K elementary reactions considered to be unidirectional, the species and energy governing equations can be described as:

$$\frac{dy}{dt} = \frac{1}{\rho} W \sum_{k=1}^{2K} S_k R^k \quad (1)$$

$$\frac{dT}{dt} = \frac{1}{\rho c_v} (-h_c W + RTU) \cdot \sum_{k=1}^{2K} S_k R^k \quad (2)$$

where y is the N-dimension mass fraction state column vector of the species, $R^k$ and $S^k$ are the reaction rate and stoichiometric vector respectively of the kth unidirectional reaction, $\rho$ is the mixture density, W is a N×N diagonal matrix with the species molecular weights, $c_v$ is the heat capacity, $h_c$ is the N-dim. vector of the species absolute enthalpies, T is the temperature, R is the universal gas constant, and U=[1, 1, . . . , 1].

Equations (1) and (2) above can be cast in CSP form as:

$$\frac{dz}{dt} = \sum_{k=1}^{2K} \hat{S}_k R^k = g(z) \quad (3)$$

where z is a (N+1) dimension state column vector defined as $z=[y,T]^T$, g(z) is the (N+1) dimension column vector field, and $\hat{S}$ is the generalized stoichiometric vector.

Resolving Equation (3) along the CSP basis vectors yields:

$$\frac{dz}{dt} = \sum_{n=1}^{N+1} a_n f^n \quad f^n = b^n \cdot g(z) = \sum_{k=1}^{2K}(b^n \cdot \hat{S}_k)R^k \quad (4)$$

where $a_n$ and $b^n$ are the column and row CSP basis vector of the nth mode, respectively ($b^i \cdot a_j = \delta^i_j$) and $f^n$ is the related amplitude. The vector field $g(z)$ is decomposed into N−E+1 modes ($a_n f^n$). The amplitudes $f^{N-E+2}$ to $f^{N+1}$ are by definition zero as per the law of atom conservation, since they represent the conservation of elements E. Ultimately, Equation (3) can be written as:

$$\frac{dz}{dt} = a_1 f^1 + \ldots + a_{N-E+1} f^{N-E+1} \quad (5)$$

Each CSP mode is characterized by (i) its time scale ($\tau_n$) that defines the duration of its action, (ii) its amplitude ($f^n$) that measures its contribution to the system evolution, and (iii) the variables that are most associated with that mode. The time scale is approximated by $\tau_n = |\lambda_n|^{-1}$, ($n=1, \ldots$ N+1−E), with $\lambda_n$ being the nth non-zero eigenvalue of the Jacobian J of the vector field g. The time scale related to a positive (negative) $\lambda_n$ is explosive (dissipative) in nature and tends to drive the system away from (towards) equilibrium. The eigenvalue $\lambda_n$ can be expressed in terms of the 2K elementary reactions and the nth right column and left row eigenvectors of J, $\alpha_n$, and $\beta^n$ respectively, as:

$$\lambda_n = \beta^n \cdot J \cdot \alpha_n = \Sigma_{k=1}^{2K} \text{grad}(S_k R^k) \cdot \alpha_n = c_1^n + \ldots + c_{2K}^n \quad (6)$$

Assuming that the M fastest time scales in the system dynamics are dissipative in nature and substantially faster than the remaining time scales, the M fastest modes can be considered exhausted, so that the system can be reduced as:

$$f^m \approx 0 (m=1, \ldots M) \quad \frac{dz}{dt} \approx \sum_{n=M+1}^{N+1} a_n f^n \quad (7)$$

The M algebraic relations $f^n \approx 0$ define a low-dimensional surface in phase space on which the solution is constrained to evolve, known as the Slow Invariant Manifold (SIM). The system of ordinary differential equations in Equation (7) defines the flow along the SIM and its dynamics is characterized by the fastest of the remaining slow time scales.

To identify the contribution of the kth reaction to the value of the nth timescale, the Time Scale Participation Index (TPI) is defined from Equation (6) as:

$$J_k^n = \frac{c_n^k}{|c_1^n| + \ldots + |c_{2K}^n|} \quad (8)$$

where n varies from 1 to N−E+1, k varies from 1 to 2K, and $\Sigma_{k=1}^{2K}|J_k^i|=1$. Positive values of the TPI relate to the reactions that promote the explosive character of the nth mode, while negative values of the TPI promote its dissipative character.

Since the 2K unidirectional reactions contribute by different amounts to the amplitude of each CSP mode, the amplitude participation index (API) is used to assess the relative contribution of each reaction to the mode amplitude.

$$P_k^n = \frac{b^n \cdot S_K R^k}{|(b^n \cdot S_1)R_1| + \ldots + |(b^n \cdot S_K)R^K|} = \frac{d^n}{|d_1^n| + \ldots + |d_{2K}^n|} \quad (9)$$

where n varies from 1 to N−E+1, k varies from 1 to 2K, and $\Sigma_{k=1}^{2K}|P_{k=1}^i|=1$. In an exhausted mode, the amplitude participation index will identify the reactions contributing to the cancellations in the algebraic relations $f^n \approx 0$. In the explosive mode, the API would reflect the contribution of the kth reaction to the amplitude of the CSP explosive mode.

The CSP pointer is a tool that identifies the variables most related to each mode. I.e., the variables that will respond the most to a perturbation along the direction of each mode. It is defined as:

$$D^n = \text{diag}[b^n a_n] = [b_1^n a_n^1 + b_2^n a_n^2 + \ldots + b_{N+1}^n a_n^{N+1}] \quad (10)$$

where $\Sigma_{k=1}^{N+1} a_n^k b_k^n = 1$.

The CSP methodology has been studied, employed, and verified extensively in various fields, including combustion, chemical kinetics, mathematics, biology, and pharmacokinetics. Further, its methodology has been verified for the study of oxidation and autoignition problems.

Example 3—NO Diagnostics in Ammonia Autoignition $NO_x$ emission remains a substantial challenge for ammonia combustion that hinders its application as a fuel due to environmental regulations. Because ammonia has a relatively low flame temperature, it is expected that thermal $NO_x$ formation will be diminished and that NO will mainly form from fuel-bound nitrogen. This is an intuitive assumption that had never been checked quantitatively. NO accounts for most of the $NO_x$ emissions of ammonia combustion, which indicates the criticality of adequately understanding the chemical dynamics of NO formation in order to control and reduce it.

Figure 2A:
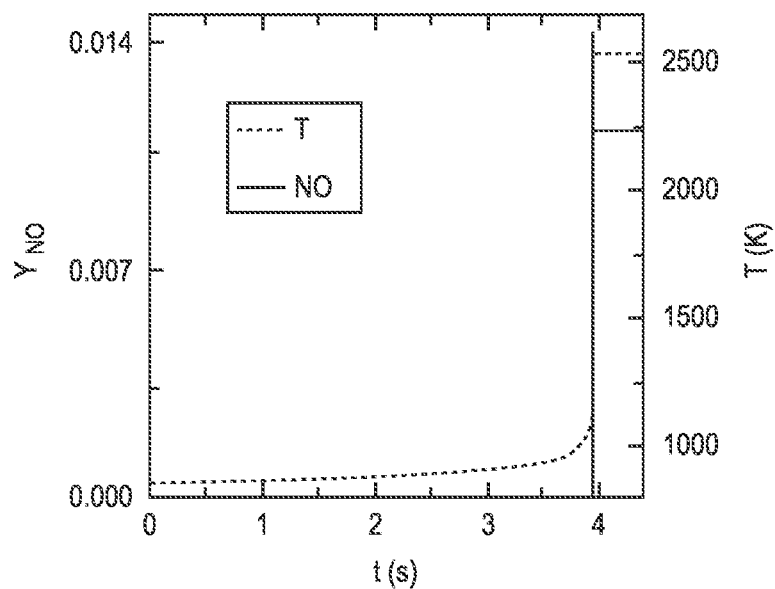
FIGS. 2A and 2B illustrate graphs showing the NO mass fraction and temperature evolution associated with pure $NH_3$/air autoignition during the explosive stage.
Figure 2B:
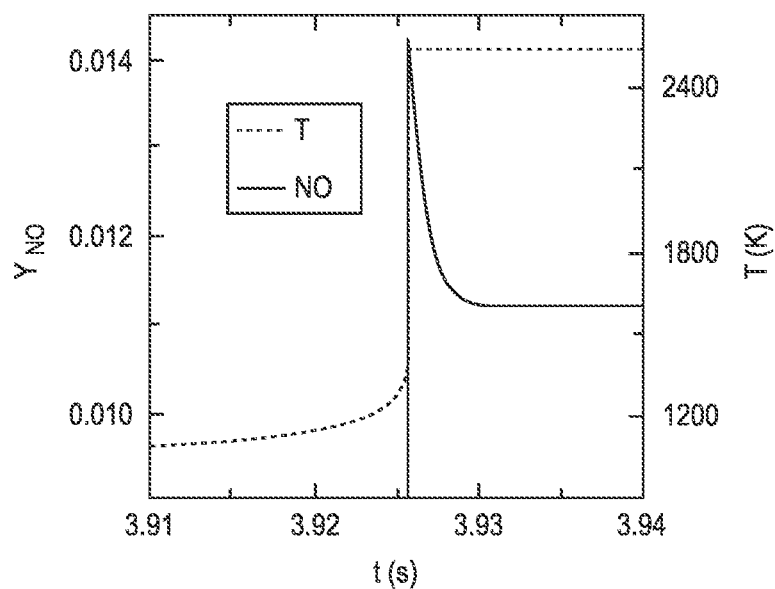

Considering an ammonia/air mixture of equivalence ratio $\phi=0.75$ at initial temperature and pressure of 850 K and 20 bar, respectively, it is shown in FIGS. 2A and 2B that during the isochoric and adiabatic autoignition of an ammonia-air mixture, substantial NO formation occurs very late in the process (i.e., at high temperature values). FIGS. 2A and 2B illustrate graphs showing the NO mass fraction and temperature evolution associated with pure $NH_3$/air autoignition during the explosive stage, with FIG. 2A illustrating a graph over the full explosive stage and FIG. 2B illustrating a graph over the final part of the explosive stage.

Figure 3:
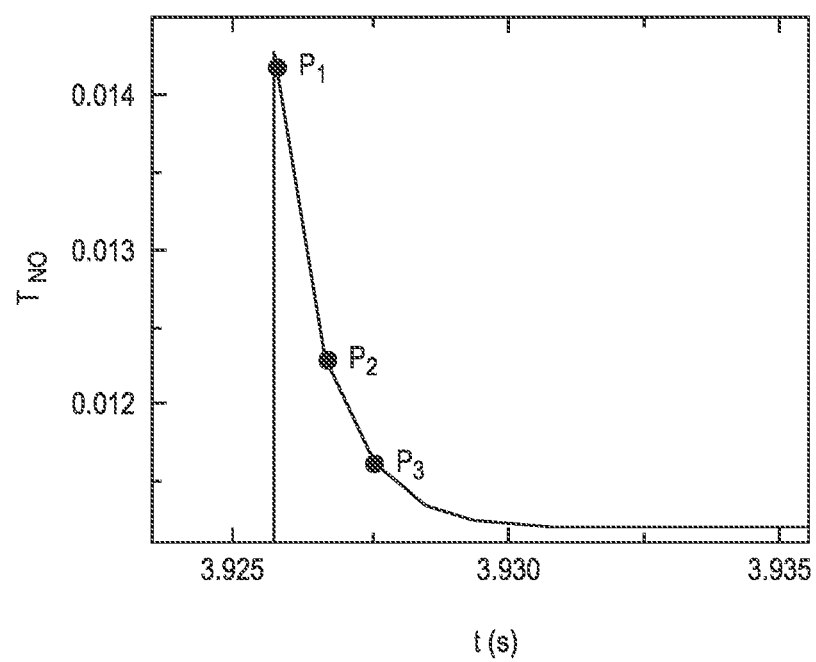
FIG. 3 illustrate a graph showing the NO mass fraction associated with pure $NH_3$/air autoignition.

FIG. 3 shows a graph illustrating the NO mass fraction, focusing on the time that NO initially overshoots before ultimately reaching its equilibrium value. Three indicative points were selected after ignition, when the NO-producing mechanism was activated and before it reached equilibrium. Point $P_1$ was taken at ignition when the temperature reached its maximum value. Point $P_2$ was taken midway to equilibrium. Point $P_3$ was taken right before equilibrium was reached. CSP diagnostics, computed at these three locations, was studied to determine the reactions most responsible for the observed NO formation. At each of those points, the CSP mode most relating to NO was identified using the CSP Pointer in Equation (10). The reactions with the highest contribution to the time scale and to the amplitude of that specific mode were identified, using the TPI in Equation (8) and the API in Equation (9). Table 1 provides a list of those identified reactions:

TABLE 1

Reactions most influencing the slow chemical dynamics related to NO formation

| | |
|---|---|
| 1: $H + O_2 \leftrightarrow O + OH$ | 67: $N + OH \leftrightarrow NO + H$ |
| 4: $OH + H_2 \leftrightarrow H + H_2O$ | 68: $N + O_2 \leftrightarrow NO + O$ |
| 5: $OH + OH \leftrightarrow O + H_2O$ | 69: $N + NO \leftrightarrow N_2 + O$ |
| 22: $H_2O_2(+M) \leftrightarrow OH + OH(+M)$ | 131: $NO + OH(+M) \leftrightarrow HONO(+M)$ |
| 127: $N_2O + O \leftrightarrow NO + NO$ | |

With the exception of the stable species $H_2$, $O_2$, $H_2O$, $H_2O_2$, $N_2$, $NH_3$, NO, and $N_2O$, all the other species discussed herein are radicals. For clarity, the radicals will not be shown with the occasionally used convention of indicating radicals with a dot.

Mixtures with $\phi=0.75$, $T(0)=850$ K, and $p(0)=20$ bar were considered, to account for conditions that are typical of gas turbines and homogeneous combustion compression ignition (HCCI) reciprocating engines. The related CSP diagnostics are shown in Table 2:

TABLE 2

The largest TPI, API, and $P_0$ values for the slow mode that relates to NO at the points $P_1$, $P_2$, and $P_3$ shown in FIG. 3.

| $P_1$ | $P_2$ | $P_3$ |
|---|---|---|
| $t_1 = 3.925$ s | $t_2 = 3.926$ s | $t_3 = 3.927$ s |
| $\lambda_1 = -1090$ s$^{-1}$ | $\lambda_2 = -1120$ s$^{-1}$ | $\lambda_3 = -1130$ s$^{-1}$ |
| | TPI | |
| 69f: −0.142 | 69f: −0.175 | *5f: −0.148 |
| *5b: −0.119 | *5b: +0.106 | *5b: +0.148 |
| *5f: +0.119 | *5f: −0.106 | 69f: −0.138 |
| 67b: −0.084 | 67b: −0.091 | 67b: −0.068 |
| 68b: −0.048 | 68b: −0.053 | *4b: +0.055 |
| *4b: −0.044 | 69b: −0.052 | *4f: −0.055 |
| *4f: +0.044 | *4b: +0.040 | 69b: −0.041 |
| 69b: −0.042 | *4f: −0.040 | 68b: −0.040 |
| | API | |
| 69f: +0.133 | 69f: +0.147 | 69f: +0.147 |
| 67b: +0.099 | 69b: −0.130 | 69b: −0.141 |
| 69b: −0.097 | 67b: +0.096 | *1b: +0.097 |
| 67f: −0.080 | *1b: +0.093 | *1f: −0.097 |
| *1b: +0.076 | *1f: −0.093 | 67b: +0.092 |
| *1f: −0.076 | 67f: −0.089 | 67f: −0.089 |
| 68b: +0.062 | 68b: +0.061 | 68b: +0.058 |
| 68f: −0.050 | 68f: −0.056 | 68f: −0.056 |
| | $P_0$ | |
| NO: +0.949 | NO: +0.918 | NO: +0.907 |
| $O_2$: +0.062 | $O_2$: +0.059 | $O_2$: +0.058 |

The symbols "f" and "b" following the reaction numbers in Table 2 denote forward and backward reaction direction, respectively. Only contributions larger than 5% are shown in Table 2. The values shown with an asterisk indicate contributions to TIP and API that cancel each other out because they are from pairs of forward and backward directions of the same reaction.

In the period of interest ($P_1$ to $P_3$), the mode that exerts the most significant influence on the evolution of the process is the one related to NO, say $a_{NO}f^{NO}$. This influence is established by the fact that the amplitude $f^{NO}$ of this mode is the largest. In this period, most of the chemical reactions have equilibrated as evidenced by the large number of forward and backward directions of the same reaction that canceling each other's contributions to TPI and API in Table 2. Neglecting the reactions that provide very small net contributions to TPI and API, leaves reactions 69f (N+NO→$N_2$+O), 67b (N+OH←NO+H) and to a smaller extend 68b (N+$O_2$←NO+O) as those reactions that contribute the most to the characteristic time scale and amplitude of the $a_{NO}f^{NO}$ mode. It is noted that although very frequent in hydrocarbon combustion, thermal NO formation does not strictly require the presence of C/H radicals, but rather formation through the set of reactions 67-69, which constitute the extended Zeldovich mechanism. Equation 69b especially shows that the mechanism for formation of N, which is a necessary prerequisite for the formation of NO, is the attack of O to the Na molecule of the air (i.e., it does not depend on the presence of ammonia). This challenges the intuitive expectation that NO formation during ammonia ignition would be due to fuel-bound nitrogen. Surprisingly, our findings show that in $NH_3$ autoignition, the chemical runaway is suspended very early during the process and the largest part of the ignition delay comprises a thermal runaway that leads to a Semenov-type explosion.

The amount of NO can be reduced either by increasing its consumption or reducing its production. Since the TPIs reported in Table 2 indicate that the NO-consuming reactions 69f, 67b, and 68b are the ones that mainly determine the time frame and the impact of the NO evolution, it follows that their reactants (atomic N, H and O) must be increased to reduce NO. Since reactions 69f, 67b, and 68b constitute the Zeldovich mechanism and since there is no realistic chemical way to suppress N, H or O, reducing the ignition temperature is a practical way to reduce NO, possibly with the identification of an appropriate additive. In practice, temperature reduction can be achieved by dilution with water vapor, so we decided it would be worth investigating the effect that $H_2O$ dilution has on both NO emission and ignition delay.

Example 4—The Effect of $H_2O$ Dilution on the Combustion of $NH_3$/Air Mixtures Using the same mixture and initial conditions defined earlier ($\phi=0.75$, and $T(0)=850$ K, and $p(0)=20$ bar), $H_2O$ was added to $NH_3$/air mixture in the following molar percentages: 5%, 10%, 15%, 20%, 30%, 40%, and 50%. Similarly positioned indicative points in the post-ignition regime, as those defined earlier in FIG. 3, were used to compute the CSP diagnostics. As in the case of pure ammonia, the mode exhibiting the largest NO CSP pointer was identified and the reactions with the largest contributions to the time scale and the amplitude of that specific mode are listed in the following Table 3 for the case with 10% $H_2O$:

TABLE 3

The largest TPI, API, and $P_0$ values for the slow mode that points to NO in the mixture of $NH_3$/air with 10% $H_2O$ for the points shown in FIG. 3.

| $P_1$ | $P_2$ | $P_3$ |
|---|---|---|
| $t_1 = 4.014$ s | $t_2 = 4.015$ s | $t_3 = 4.016$ s |
| $\lambda_1 = -811$ s$^{-1}$ | $\lambda_2 = -831$ s$^{-1}$ | $\lambda_3 = -840$ s$^{-1}$ |
| | TPI | |
| *5b: −0.142 | 69f: −0.197 | *5f: −0.156 |
| *5f: +0.142 | 67b: +0.103 | *5b: +0.156 |
| 69f: −0.118 | *5b: +0.082 | 69f: −0.129 |
| 67b: −0.070 | *5fb: +0.082 | 67b: −0.062 |

TABLE 3-continued

The largest TPI, API, and $P_0$ values for the slow mode that points to NO in the mixture of $NH_3$/air with 10% $H_2O$ for the points shown in FIG. 3.

| $P_1$ | $P_2$ | $P_3$ |
|---|---|---|
| *4b: −0.052 | 68b: −0.063 | *4b: +0.057 |
| *4f: +0.052 | 69b: −0.056 | *4f: −0.057 |
| 68b: −0.041 | 157b: −0.036 | 68b: −0.038 |
| *131f: +0.040 | *4b: +0.030 | 69b: −0.036 |
| *131b: −0.040 | *4f: +0.030 | *131b: +0.034 |
| | API | |
| 69f: +0.130 | 69f: +0.144 | 69f: +0.147 |
| 67b: +0.098 | 69b: −0.122 | 69b: −0.140 |
| 69b: −0.092 | 67b: +0.095 | *1b: +0.097 |
| 67f: −0.078 | *1b: +0.089 | *1f: −0.097 |
| *1b: +0.073 | *1f: −0.089 | 67b: +0.090 |
| *1f: −0.073 | 67f: −0.086 | 67f: −0.087 |
| 68b: +0.063 | 68b: +0.062 | 68b: +0.059 |
| 68f: −0.050 | 68f: −0.056 | 68f: −0.057 |
| | $P_0$ | |
| NO: +0.956 | NO: +0.927 | NO: +0.911 |
| $O_2$: +0.059 | $O_2$: +0.056 | $O_2$: +0.055 |

The symbols "f" and "b" following the reaction numbers in Table 3 denote forward and backward reaction direction, respectively. Only contributions larger than 5% are shown in Table 3. The values shown with an asterisk indicate contributions to TIP and API that cancel each other out because they are from pairs of forward and backward directions of the same reaction.

Table 3 also lists the variable that most relate to the NO-mode. The diagnostics are almost identical to those of Table 2, which supports the conclusion that the effect of $H_2O$ dilution in the NO generation is mainly thermal.

Table 4 below lists the changes in ignition delay, the final temperature, and the NO mass fraction for various degrees of $H_2O$ dilution. The table shows the changes as a percent change from a base-case of 0% $H_2O$. As can be seen, $H_2O$ dilution reduces both the final equilibrium temperature and the NO mass fraction, with the magnitude of those reductions being increased as the amount of $H_2O$ increases. The ignition delay increases with the amount of $H_2O$ dilution as well. These results indicate that the drop in the final temperature is relatively small compared to the reduction in NO emissions.

TABLE 4

Change in ignition delay, final temperature, and NO mass fraction with various mole fractions of $H_2O$ in the initial mixture.

| | % $t_{ign}$ [s] | % $T_{final}$ [K] | % $y_{NO}$ |
|---|---|---|---|
| 0% $H_2O$ | 3.936 | 2535.68 | $1.12 \times 10^{-2}$ |
| 5% $H_2O$ | +0.75 | −0.62 | −3.04 |
| 10% $H_2O$ | +2.24 | −1.29 | −6.30 |
| 15% $H_2O$ | +4.13 | −2.03 | −9.79 |
| 20% $H_2O$ | +6.40 | −2.84 | −13.5 |
| 30% $H_2O$ | +12.26 | −4.72 | −21.9 |
| 40% $H_2O$ | +20.61 | −7.05 | −31.6 |
| 50% $H_2O$ | +33.12 | −10.0 | −42.9 |

FIGS. 4A-4E illustrate the findings of the effect that $H_2O$ dilution has on ignition delay and show the evolution of selected species prior to and post-ignition. The mass fractions of N, O, H, OH, and $H_2O_2$ along with the temperature are shown in FIGS. 4A-4E, respectively, as a function of scaled time (time divided by the ignition delay) with various $H_2O$ percentages. The solid line in each graph represents the case of 0% $H_2O$ dilution, the dashed line in each graph represents the case of 20% $H_2O$ dilution, and the dotted line in each graph represents the case of 50% $H_2O$ dilution. In all three cases of $H_2O$ dilution considered, there is a short initial period of up to about 5% to 15% of $t_{ign}$ in which radicals are generated at a very high rate. This rate diminishes considerably after this short initial period and then picks up again close to $t_{ign}$. These findings suggest that the chemical runaway regime is very short in this case and that the thermal runaway regime is relatively long, occupying the largest portion of ignition delay.

Figure 4A:
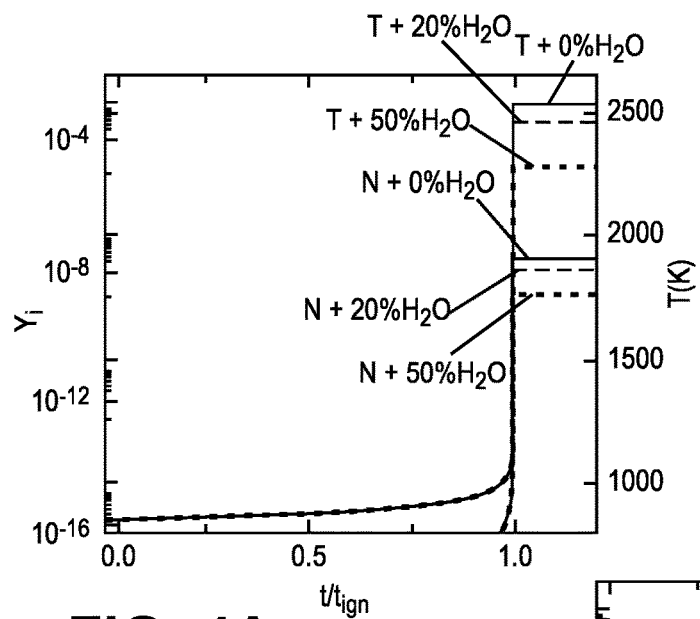
FIGS. 4A-4E illustrate graphs showing the evolution of selected chemical species prior to and post-ignition.
Figure 4B:
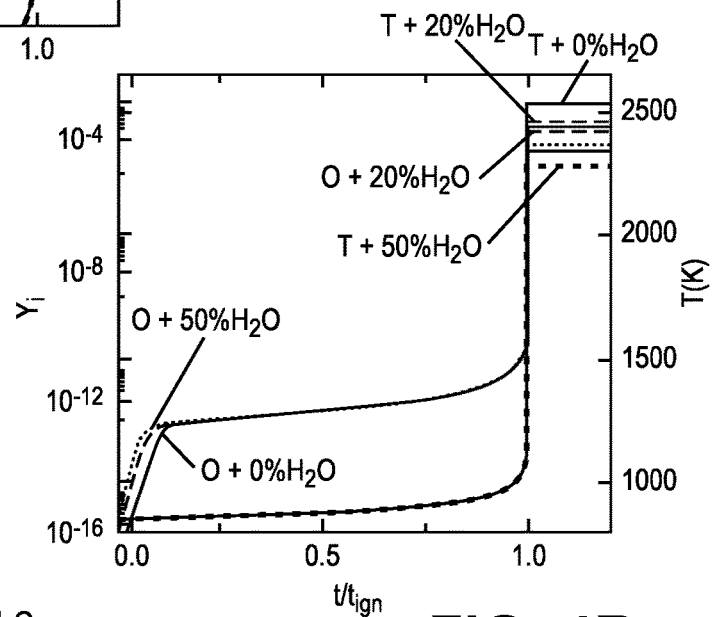
Figure 4C:
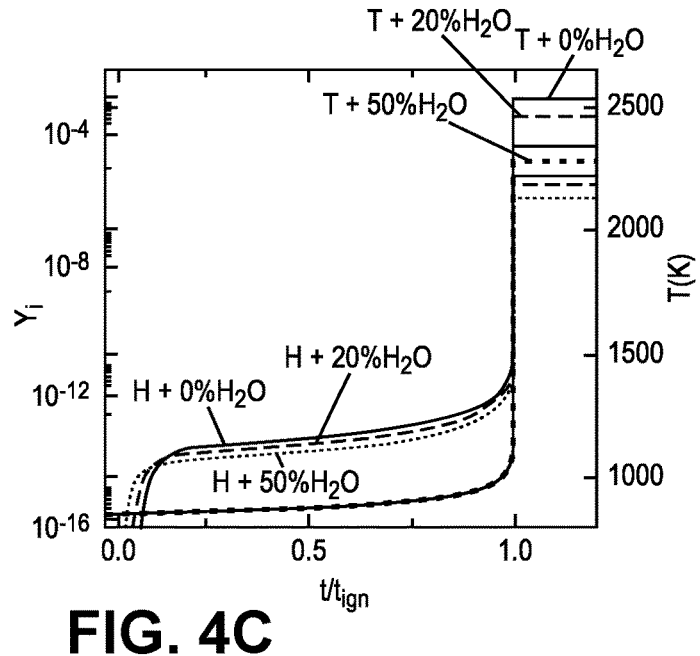
Figure 4D:
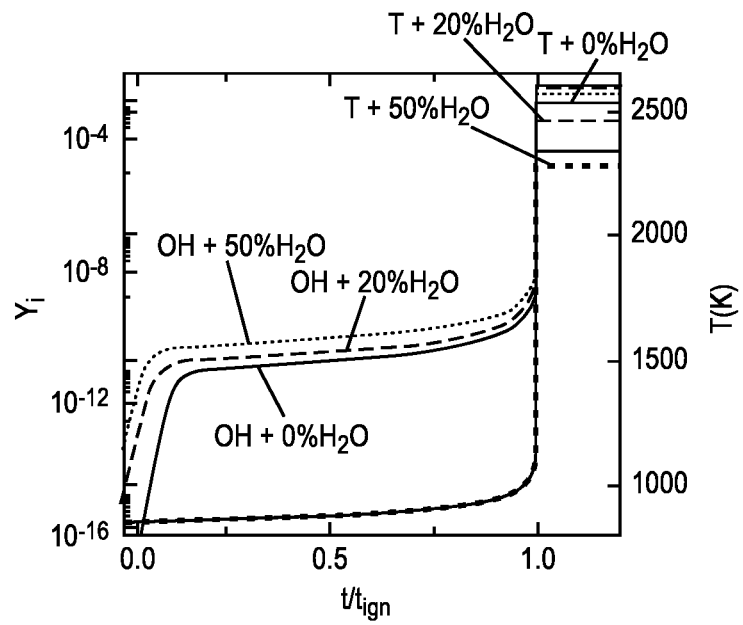
Figure 4E:
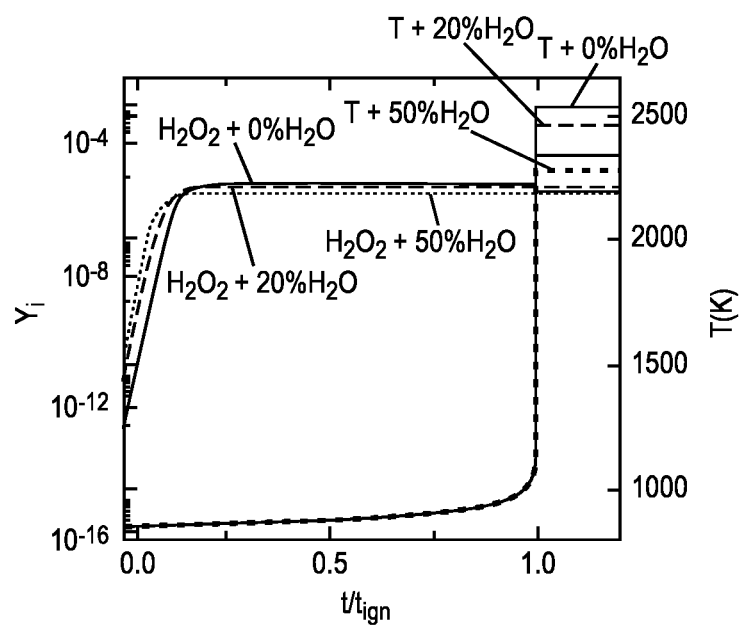

FIGS. 4A-4E show that increasing $H_2O$ dilution accelerates the action in the chemical runaway regime, with a notable effect of increased OH generation (see FIG. 4D). In contrast, during the thermal runaway regime, increasing $H_2O$ dilution does not introduce significant additional changes. This indicates that the chemical activity of water vapor is significant only during the chemical runaway. The absence of significant chemical activity during the long thermal runaway regime and the increasing $t_{ign}$ with increasing $H_2O$ dilution shows that vapor acts mainly as a thermal buffer.

Although it was shown that the main influence of $H_2O$ dilution is based on its action as a thermal buffer, it also exerts a chemical influence. This action can be established by investigating the dynamics of reaction 69f, which was shown by the results displayed in Tables 2 and 4 to most influence the CSP mode related to NO. FIG. 4B shows that in the post-ignition region the O-radical mass fraction decreases with increasing $H_2O$ diluent. Since O is one of the reactants in reaction 69b and a primary agent for NO formation, this feature leads to a reduced NO formation. To understand the chemical effect related to the reduction of O, the CSP mode related to O was investigated at the same points $P_1$ to $P_3$ that are shown in FIG. 3. The reactions with the largest contribution to the time scale and the amplitude of that specific mode were identified. The results computed at $P_2$ are displayed in the below Table 5, with those from points $P_1$ and $P_3$ being qualitatively similar.

TABLE 5

The largest TPI, API, and $P_O$ for the mode that points to O at $P_2$; only contributions larger than 5% are shown.

| TPI | | API | | Po | |
|---|---|---|---|---|---|
| 5b | $-6.78 \times 10^{-1}$ | 5b | $-3.95 \times 10^{-1}$ | O | $7.47 \times 10^{-1}$ |
| 5f | $-1.79 \times 10^{-1}$ | 5f | $3.95 \times 10^{-1}$ | OH | $2.03 \times 10^{-1}$ |

The mode related to O, say $a_O f^O$, is a fast exhausted mode ($f^O \approx 0$). As Table 5 shows, this mode expresses the equilibration of reaction 5: $OH+OH \leftrightarrow O+H_2O$ (large APIs of its two directions, canceling each other), which is mainly driven by its backward direction (involves the most pointed species and exhibits the largest TPI). These results show that insertion of $H_2O$ into the combustion mixture shifts this equilibrium to lower mass fractions of O, which will lead to decreased NO generation via reaction 69b.

Example 5—The Effect of $H_2O$ Dilution on the Combustion of $NH_3$/Air and 2% $H_2O_2$ Mixtures We have shown above that mixing $NH_3$ with $H_2O_2$ tackled a first important issue of ammonia combustion, namely it shortened the ignition delay. In particular, we were able to show that inserting just 2% molar $H_2O_2$ in the reactant mixture reduced the ignition delay by a factor of approximately 30, as shown in FIG. 1. $H_2O_2$ is not only a component of the initial mixture but an intermediate product of oxidation with a pivotal role in the chemical kinetics of the combustion process. Formation of $H_2O_2$ is preceded by the formation of $HO_2$ through the reaction of the H radical (which comes from H-abstraction from the fuel molecule) with $O_2$ according to the reaction $H+O_2(+M) \rightarrow HO_2(+M)$. The formation of $H_2O_2$ follows as a result of $HO_2$ chemistry. Insertion of $H_2O_2$ into the initial mixture causes a drastic increase of OH production through reaction 22f and therefore a drastic decrease of ignition delay. However, the ignition delay decrease came with a modest increase in $NO_x$ emissions. We have also shown above that insertion of water vapor into the mixture can decrease NO, but at the expense of an increase in ignition delay (see Table 4).

We then investigated the combustion of ternary $NH_3/H_2O/H_2O_2$ mixtures with the aim to perhaps identify an optimum composition. Towards this goal, $H_2O$ was added to a mixture of $NH_3/2\%$ $H_2O_2$/air in various mole fractions of $H_2O$ (5%, 10%, 15%, 20%, 30%, 40%, and 50%). The change in ignition delay, final temperature, and NO mass fraction of this three-part mixture are shown in the below Table 6. Table 6 shows the changes as a percent change from a base-case of 0% $H_2O$.

TABLE 6

Change in ignition delay, final temperature, and NO mass fraction of $NH_3/2\%$ $H_2O_2$/air mixture with variable mole fractions of $H_2O$ in the initial mixture.

| | % $t_{ign}$ [s] | % $T_{final}$ [K] | % $y_{NO}$ |
|---|---|---|---|
| 0% $H_2O$ | 0.1568 | 2550.03 | $0.1139 \times 10^{-1}$ |
| 5% $H_2O$ | −7.00 | −0.61 | −3.01 |
| 10% $H_2O$ | −13.88 | −1.26 | −6.24 |
| 15% $H_2O$ | −20.61 | −1.99 | −9.71 |
| 20% $H_2O$ | −27.18 | −2.78 | −13.42 |
| 30% $H_2O$ | −39.73 | −4.63 | −21.85 |
| 40% $H_2O$ | −51.27 | −6.94 | −31.66 |
| 50% $H_2O$ | −61.41 | −9.91 | −43.12 |

It can be seen from Table 6 that when $H_2O_2$ is present, $H_2O$ dilution reduces the ignition delay of the mixture significantly and that the reduction increases with the increase of $H_2O$ content. Also, the decrease of the final temperature and of the final NO mass fraction is similar to the one with the same $H_2O$ dilution, as reported in Table 5, but without $H_2O_2$. This shows that the effect of $H_2O$ dilution on NO, as a thermal buffer, remains essentially unaffected by the presence of $H_2O_2$.

Figure 5:
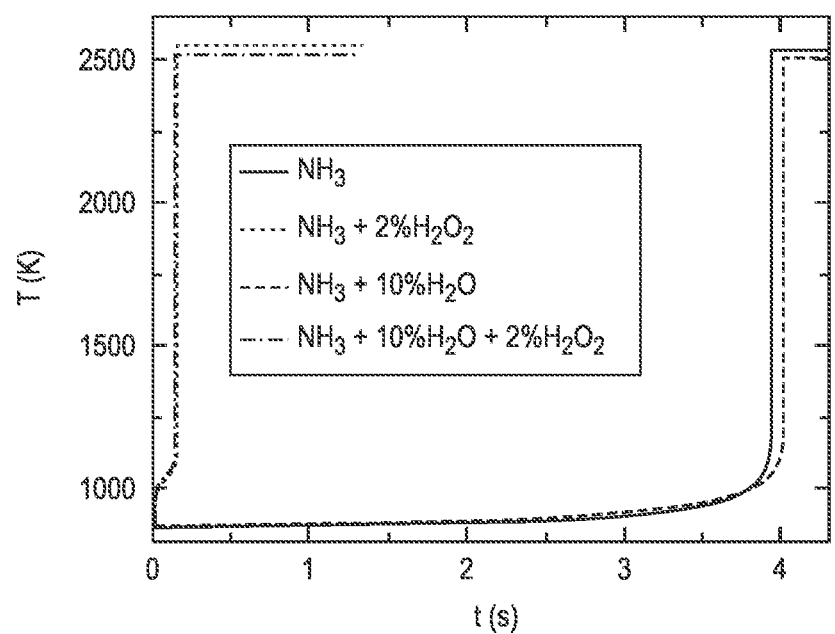
FIG. 5 illustrates a graph showing the effect of $H_2O$ and/or $H_2O_2$ dilution on ignition delay.

FIG. 5 shows a graph illustrating the effect of $H_2O$ and/or $H_2O_2$ dilution on ignition delay. Specifically, the graph in FIG. 5 illustrates the temperature evolution of a mixture of pure $NH_3$ with air, a mixture of $NH_3$ and air with 2% molar $H_2O_2$, of a mixture of $NH_3$ with air and 10% molar $H_2O$, and a mixture of $NH_3$ with air and 2% molar $H_2O_2$ and 10% molar $H_2O$. In the absence of $H_2O$, a 2% molar $H_2O_2$ addition considerably decreases ignition delay. A 10% molar $H_2O$ dilution of pure $NH_3$ slightly increases ignition delay, as compared to pure $NH_3$. A 10% molar $H_2O$ dilution of a $NH_3/2\%$ molar $H_2O_2$ mixture causes a slight decrease in ignition delay, as compared to a mixture of $NH_3/2\%$ molar $H_2O_2$ that is not diluted with water.

Figure 6A:
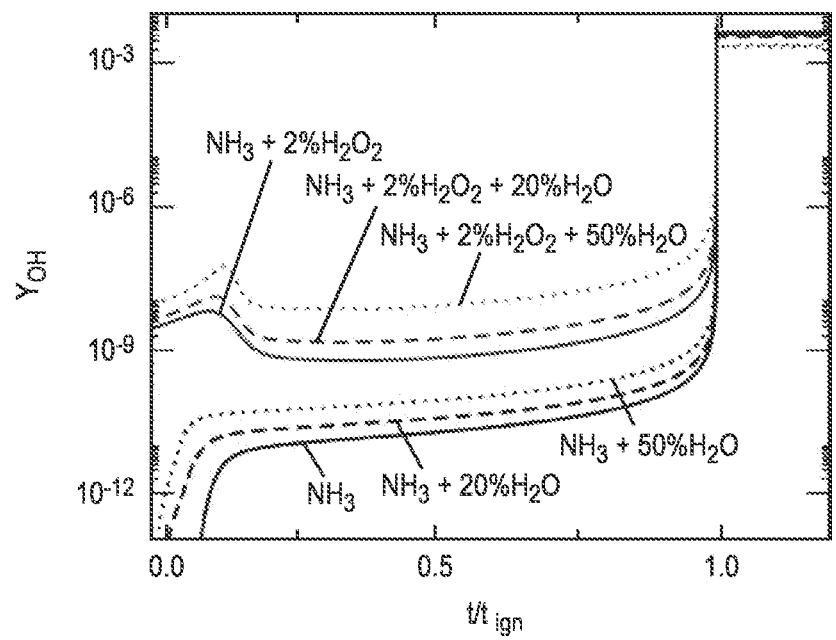
FIG. 6A illustrates a graph of the evolution of OH mass fraction against scaled time ($t/t_{ign}$) for a $NH_3$/2% molar $H_2O_2$ mixture with various $H_2O$ molar percentages.

The response of the $NH_3$ autoignition in the presence of $H_2O$ and $H_2O_2$ additions can be explained on the basis of the results displayed in FIG. 6A. FIG. 6A illustrates a graph of the evolution of OH mass fraction against scaled time ($t/t_{ign}$) when considering $NH_3/2\%$ molar $H_2O_2$ mixture with various $H_2O$ molar percentages (0% $H_2O$ denoted by solid lines, 20% molar $H_2O$ denoted by dashed lines, and 50% molar $H_2O$ denoted by dotted lines). FIG. 6A shows that the addition of $H_2O_2$ considerably increases the OH levels during the early stage of the ignition delay (i.e., the chemical runaway regime). This is likely due to the enhanced action of reaction 22f: $H_2O_2(+M) \rightarrow OH+OH(+M)$. FIG. 6A also shows that the addition of $H_2O$ leads to increased levels of OH in both the absence and the presence of $H_2O_2$. This indicates that the rise of OH with the addition of $H_2O$ is higher in the presence of $H_2O_2$ in both the relative and absolute sense. As a result, the increase of the OH contribution towards autoignition caused by $H_2O$ is higher in the presence of $H_2O_2$.

Figure 6B:
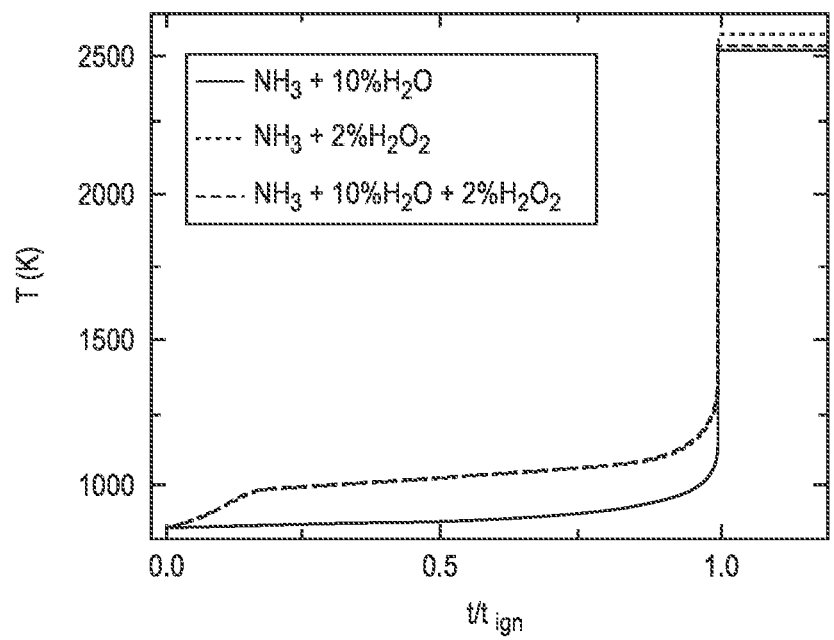
FIG. 6B illustrates a graph showing the temperature evolution against scaled time ($t/t_{ing}$) for a $NH_3$/10% molar $H_2O$ mixture, a $NH_3$/2% molar $H_2O_2$ mixture, and a $NH_3$/10% molar $H_2O$/2% molar $H_2O_2$ mixture FIG. 7 illustrate a flow-chart for a method of combusting ammonia.

FIG. 6B illustrates a graph showing the temperature evolution against scaled time ($t/t_{ing}$) for the $NH_3/10\%$ molar $H_2O$ mixture, the $NH_3/2\%$ molar $H_2O_2$ mixture, and the $NH_3/10\%$ molar $H_2O/2\%$ molar $H_2O_2$ mixture. FIG. 6B shows that in the presence of $H_2O_2$ two-stage ignition occurs, with an early increase in temperature, from the early generation of OH via reaction 22f. The decrease of the ignition delay with the addition of $H_2O_2$ is due to the enhanced chemical action in the early stage of the process, while the addition of $H_2O$ results in a small increase in the absence of $H_2O_2$ (due to the thermal buffer effect) and in a small decrease in its presence (due to the enhancement of the $H_2O_2$ chemical action).

Our work shows that NO formation during isochoric, adiabatic autoignition of ammonia/air mixtures is a slow process that develops after temperature has reached its maximum value and the rest of autoignition chemistry has equilibrated. Further, NO formation occurs through the reactions of the extended Zeldovich mechanism, which indicates that NO formation is thermal and not due to fuel-bound nitrogen. Still further, NO formation can be suppressed by addition of water vapor to the fuel mixture, but this causes an increase of the already unacceptably long ignition delay of ammonia. Yet further, the addition of just 2% molar hydrogen peroxide to the mixture not only decreases the ignition delay by a factor of 30 but also changes the way water vapor acts. Specifically, in the ternary mixture $NH_3/H_2O/H_2O_2$, the addition of water vapor does not prolong but rather shortens the ignition delay because the water facilitates the increased production of OH radicals due to the presence of $H_2O_2$.

Our work also shows that $NH_3/H_2O/H_2O_2$ mixtures can surprisingly be used to overcome at least two disadvantages of ammonia combustion, namely the formation of NO (through the action of $H_2O$) and long ignition delay (through the action of $H_2O_2$). Also surprisingly, we have determined that the action of each additive does not counter the action of the other.

Thus, the scope of this disclosure should be determined by the appended claims and their legal equivalents. Therefore, it will be appreciated that the scope of the present disclosure fully encompasses other embodiments which may become obvious to those skilled in the art, and that the scope of the present disclosure is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims. Furthermore, no element, component, or method step in the present disclosure is intended to be dedicated to the public regardless of whether the element, component, or method step is explicitly recited in the claims.

The foregoing description of various preferred embodiments of the disclosure have been presented for purposes of illustration and description. It is not intended to be exhaustive or to limit the disclosure to the precise embodiments, and obviously many modifications and variations are possible in light of the above teaching. The example embodiments, as described above, were chosen and described in order to best explain the principles of the disclosure and its practical application to thereby enable others skilled in the art to best utilize the disclosure in various embodiments and with various modifications as are suited to the particular use contemplated. It is intended that the scope of the disclosure be defined by the claims appended hereto.

Various examples have been described. These and other examples are within the scope of the following claims.

What is claimed is:

1. A method for combusting ammonia, the method consisting of:
    directing ammonia, hydrogen peroxide, and water into a chamber to create a fuel mixture, wherein the amount of ammonia in the fuel mixture is 48-97% molar, and wherein the amount of hydrogen peroxide in the fuel mixture is 2% molar and wherein the amount of water in the fuel mixture is up to 50% molar, and combusting the fuel mixture with an oxidant.

2. The method of claim 1, wherein the amount of water in the fuel mixture is up to 30% molar.

3. The method of claim 2, wherein the amount of water in the fuel mixture is between 5% molar and 15% molar.

4. The method of claim 3, wherein the amount of water in the fuel mixture is 10% molar.

5. The method of claim 1, wherein the ammonia, the hydrogen peroxide, and the water are all directed into the chamber separately.

6. The method of claim 1, wherein the oxidant is air.

7. The method of claim 1, wherein the oxidant is oxygen.

8. A method for powering an internal combustion engine, the method consisting of:
    directing ammonia, hydrogen peroxide, and water into a combustion chamber of the internal combustion engine to create a compressed fuel mixture, wherein the combustion chamber is defined by a cylinder and a piston and wherein the amount of ammonia in the fuel mixture is 48-97% molar, the amount of hydrogen peroxide in the fuel mixture is 2% molar and wherein the amount of water in the fuel mixture is up to 50% molar, and
    combusting the compressed fuel mixture to increase a pressure in the combustion chamber and generate a force acting against the piston.

9. The method of claim 8, wherein the piston compresses the ammonia, hydrogen peroxide, and water in the cylinder to form the compressed fuel mixture.

10. The method of claim 9, wherein the piston generates a compression ratio of between 12 and 20 in the cylinder.

11. The method of claim 8, further including directing air into the combustion chamber prior to combusting the compressed fuel mixture.

12. The method of claim 8, wherein the internal combustion engine is a spark-ignition engine.

13. The method of claim 8, wherein the internal combustion engine is a compression-ignition engine.

* * * * *